(12) United States Patent
Northern

(10) Patent No.: US 6,892,628 B2
(45) Date of Patent: *May 17, 2005

(54) SELF-BASTING COOKING APPARATUS AND METHOD

(76) Inventor: Robert Theodore Northern, 2732 Hartzer St., South Bend, IN (US) 46601

( * ) Notice: Subject to any disclaimer, the term of this patent is extended or adjusted under 35 U.S.C. 154(b) by 0 days.

This patent is subject to a terminal disclaimer.

(21) Appl. No.: 10/447,475

(22) Filed: May 28, 2003

(65) Prior Publication Data

US 2004/0009276 A1 Jan. 15, 2004

Related U.S. Application Data

(63) Continuation of application No. 09/351,095, filed on Jul. 9, 1999, now Pat. No. 6,582,745.

(51) Int. Cl.[7] .............................. A47J 37/04; A47J 37/00
(52) U.S. Cl. .............................. 99/346; 99/330; 99/482; 99/487; 426/523; 426/509
(58) Field of Search .......................... 99/346, 330, 482, 99/487, 345, 347, 516, 444; 426/523, 509, 506, 510

(56) References Cited

U.S. PATENT DOCUMENTS

| | | | |
|---|---|---|---|
| 4,060,026 A | * 11/1977 | Lohr et al. ..................... 99/346 |
| 4,061,083 A | 12/1977 | Caliva | |
| 4,581,989 A | * 4/1986 | Swartley ..................... 99/346 |
| 4,732,137 A | 3/1988 | Parsons | |
| 5,066,505 A | * 11/1991 | Vos et al. .................... 426/438 |
| 5,242,704 A | 9/1993 | Prestigiacomo | |
| 5,365,039 A | * 11/1994 | Chaudoir .................... 219/401 |
| 5,501,142 A | 3/1996 | Bailey | |
| 5,511,535 A | 4/1996 | Landstrom et al. | |
| 5,727,449 A | 3/1998 | Healy et al. | |
| 6,047,694 A | * 4/2000 | Landstrom et al. ....... 126/25 C |
| 6,582,745 B1 | 6/2003 | Northern | |

* cited by examiner

Primary Examiner—Reginald L. Alexander
(74) Attorney, Agent, or Firm—Jenner & Block LLP

(57) ABSTRACT

A cooking apparatus (100) includes a housing (102), a food supporting structure (202), such as a grill and/or a rotisserie and a heat source below the food supporting structure. A delivery tube (114) ends in a plurality of nozzles (206) spaced from each other and above the food supporting structure. A pump (110) is selectively activated by an electronic control circuit to inject a basting liquid into the delivery tube from a supply tube (112). By periodically activating the pump, a basting liquid is applied to food.

13 Claims, 4 Drawing Sheets

SELF-BASTING COOKING APPARATUS AND METHOD

CROSS REFERENCE TO RELATED APPLICATIONS

This application is a continuation of application Ser. No. 09/351,095, filed Jul. 9, 1999, now U.S. Pat. No. 6,582,745, entitled "Self-Basting Cooking Apparatus and Method."

FIELD OF THE INVENTION

The present invention relates generally to cooking apparatus, and in particular, to a cooking apparatus for automatically basting food prepared therein.

BACKGROUND OF THE INVENTION

It is well known among good cooks that it is often important to periodically baste or moisten food during the food preparation process. This is particularly important when barbecuing or using an outdoor grill for cooking food. Often food cooked with a charcoal or gas grill is dry and undesirable unless the food is periodically moistened during the cooking process. Food grilled in other environments, such as restaurants, is subject to the same conditions.

It is also well known among good cooks that the liquid used to baste or periodically moisten food may vary. Some cooks prefer water. Other cooks prefer wine, beer, vinegar, barbecue sauce or another spiced liquid.

Typically the cook manually applies the basting liquid to the food at intervals during the cooking process. This process has obvious drawbacks and inefficiencies, including consuming the cook's time and allowing for a large margin of error in the basting process.

Automatic basting apparatus have been proposed for alleviating the problems and inefficiencies associated with manually basting food during the food preparation process. For example, in U.S. Pat. No. 4,732,137 issued to Parsons, an apparatus for dispensing a liquid basting sauce through an elongated sauce delivery tube is disclosed. The sauce delivery tube has multiple spray nozzles suspended in spaced relationship along a tube and above a barbecue grill. Connected to one end of the delivery tube is a pressurized sauce supply bottle, which contains the selected basting sauce.

A timer controlled injection valve connects the pressurized sauce supply bottle to the delivery tube so that activation of the valve by the timer device causes the sauce to be injected under pressure into the tube and dispensed through the spray nozzles. In addition to disclosing a pressurized sauce supply bottle, Parsons discloses using a supply of compressed air to pull sauce from a non-pressurized bottle.

A major problem with the apparatus disclosed in Parsons is the requirement of a pressurized basting liquid or a source of compressed air to force the basting liquid down a delivery tube. Since the basting sauce is often prepared by the cook just prior to cooking the food, a pressurized supply of the basting sauce is generally not available. Similarly, maintaining a supply of compressed air is often undesirable and impractical.

Therefore, a need exists for a practical, self-basting cooking apparatus that eliminates the inefficiencies and drawbacks of manual basting and addresses the shortcomings of known automatic basting apparatus.

SUMMARY OF THE INVENTION

In accordance with one aspect of the present invention, a cooking apparatus includes a housing, a food supporting structure within the housing, and a heat source below the food supporting structure. A plurality of nozzles are mounted spaced from each other and above the food supporting apparatus. A delivery tube is in communication with the nozzles such that a liquid in the delivery tube is transported to the nozzles. A pump is activated to inject a liquid from a supply tube into the delivery tube. The liquid is preferably stored in a supply container that is connected to the supply tube.

In electronic control circuit activates the pump at predefined intervals for a predefined duration. Preferably, a first timer circuit determines the predefined interval and a second timer circuit determines the predefined duration. In accordance with another aspect of the invention, a method of cooking a food item includes (a) placing the food item on a food supporting structure; (b) activating a pump to supply a basting liquid from a supply tube to :a delivery tube; and (c) supplying the basting liquid from the delivery tube to the food item. Preferably, the food supporting structure is a rotisserie and/or a grill and the supply tube receives liquid from a supply container containing water, vinegar, wine, beer, or barbecue sauce.

DETAILED DESCRIPTION OF THE PREFERRED EMBODIMENTS

Figure 1:
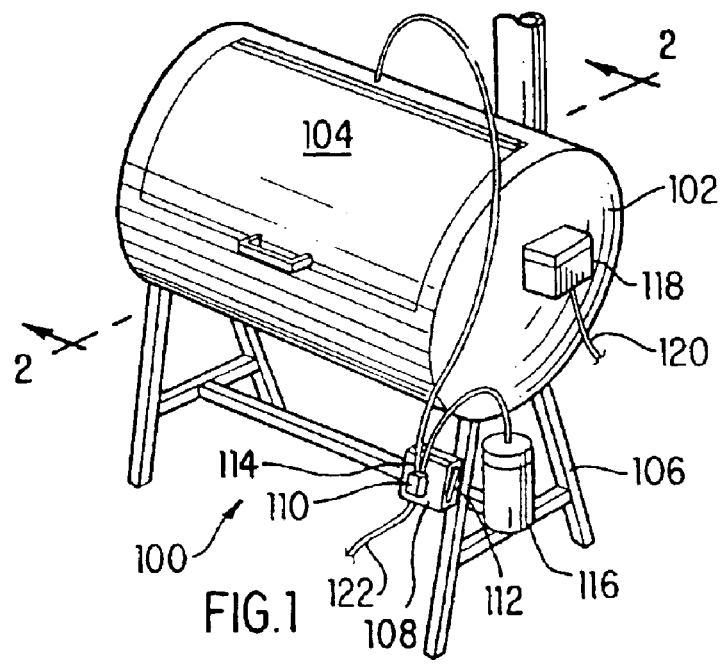
FIG. 1 is a perspective view of a self-basting cooking apparatus in accordance with the present invention.

FIG. 1 shows a self-basting cooking apparatus 100 in accordance with the present invention. Cooking apparatus 100 includes a housing 102 that includes a door 104. Housing 102 is mounted on a frame 106, which supports the housing 102. A control box 108 is mounted to frame 106. Control box 108 houses the electronics used to control the basting apparatus in accordance with the invention. Mounted on control box 108 is a pump 110. Pump 110 is coupled to a supply tube 112 and a delivery tube 114. Supply tube 112 is coupled to a container 116, shown resting on frame 106. Delivery tube 114 is shown entering housing 102.

Housing 102 is provided by any structure suitable for housing and cooking food. For example, housing 102 is a grill. Housing 102 is alternatively constructed from steel, aluminum, iron or any other suitable material.

Door 104 is used to access the interior of housing 102. Preferably, door 104 is hingedly attached to housing 102 and includes a handle for safe access.

In a preferred embodiment, cooking apparatus 100 includes a rotisserie. A rotisserie motor housing 118 is shown mounted on housing 102. Wires 120 are shown for connecting a rotisserie motor (not shown) to a power source (not shown), such as a battery or an A.C. outlet.

Figure 2:
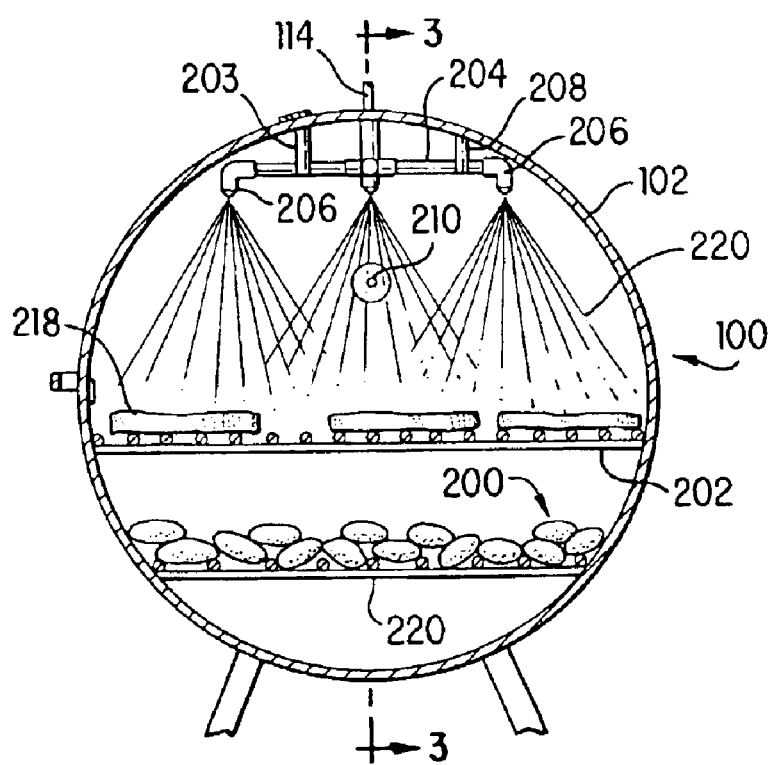
FIG. 2 is a cross sectional View of the cooking apparatus shown in FIG. 1 taken along line 2—2.

FIG. 2 is a cross-sectional view of cooking apparatus 100 taken along line 2—2 of FIG. 1. FIG. 2 shows generally the interior of housing 102. Included within the interior of housing 102 is a heating source 200, a food supporting structure 202 and an apparatus 204 for delivering a basting liquid. Heating source 200 is mounted at a bottom portion of housing 102. Spaced above heating source 200 is a food supporting structure 202. In FIG. 2, food portions 218 are shown resting on food supporting structure 202. Spaced above the food supporting structure 202 is apparatus 204 for supplying a basting liquid. Apparatus 204 has supports 208, which suspend the apparatus from a surface of housing 102.

Heating source 200 is shown in FIG. 2 as charcoal briquettes resting on a wire grill 220. Other heating sources are alternatively used, including a fire box, gas heating source or electrical heating source. Food supporting structure 202 is shown in FIG. 2 as a wire grill supported in the interior of housing 102 in a customary manner. Food supporting structure 202 is alternatively, any structure suitable for supporting food above a heating source. One alternative food supporting structure is a rotisserie. Rotisserie rod 210 is available for this purpose.

Delivery tube 114 is in open communication with apparatus 204, such that a liquid in delivery tube 114 travels through apparatus 204. Apparatus 204 is preferably piping or tubing that is either connected to or in communication with delivery tube 114. Apparatus 204 ends in a plurality of nozzles 206 which disburse a basting liquid 220 onto food portions 218 and within the interior of housing 102.

Figure 3:
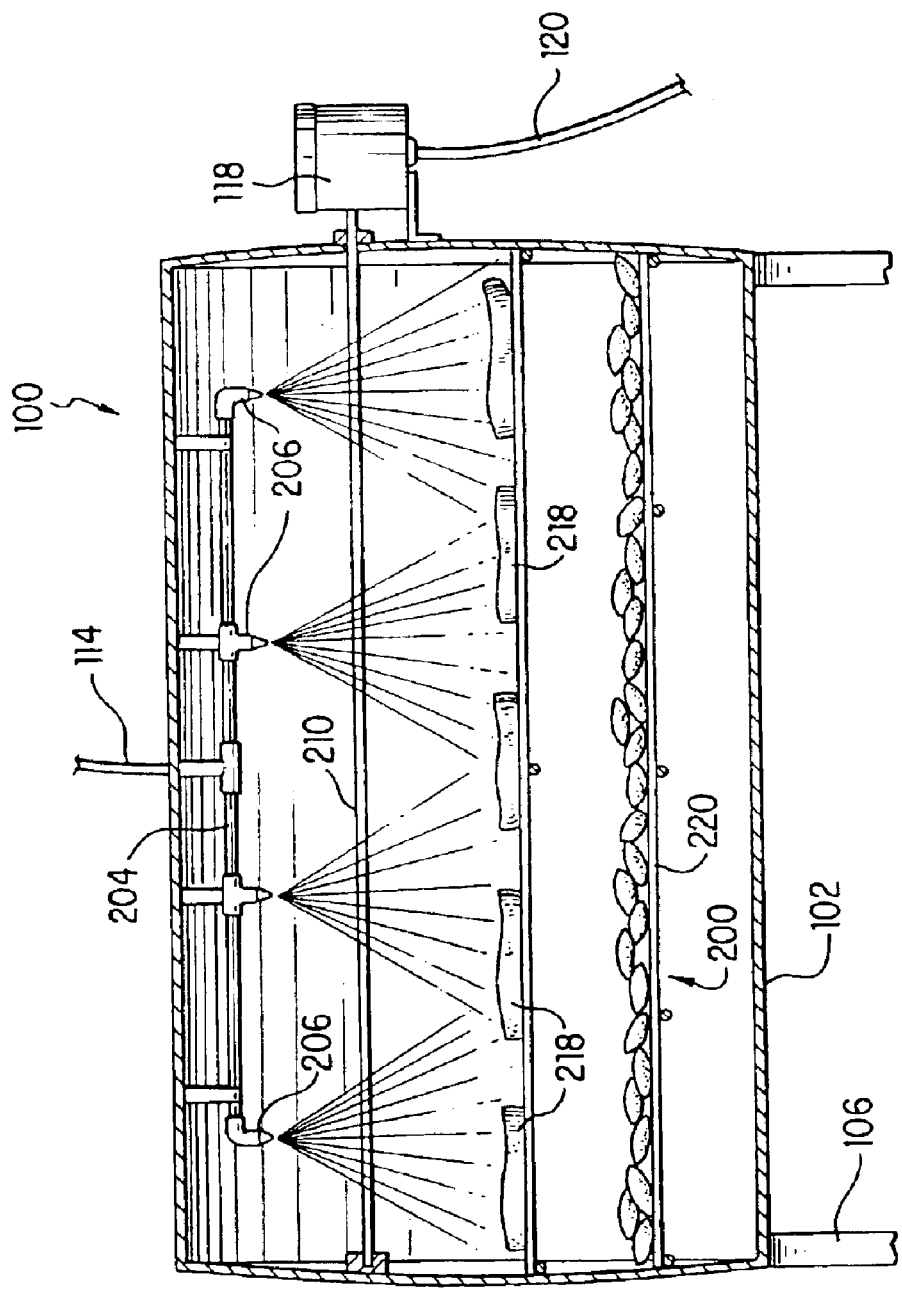
FIG. 3 is a cross-sectional view of the cooking apparatus shown in FIG. 2 taken along line 3—3.

FIG. 3 is a sectional view of cooking apparatus 100 taken along line 3—3 shown in FIG. 2. As best seen in FIG. 3, apparatus 100 includes a rotisserie rod 210 which extends the width of the interior of housing 102. Rotisserie rod 210 is shown in FIG. 3 without any food portions mounted thereon. In a traditional manner, food may be attached to rotisserie rod 210, which is rotated by a motor within rotisserie motor housing 118. In accordance with the invention, food portions mounted on rotisserie rod 210 are basted with apparatus 204.

Figure 4:
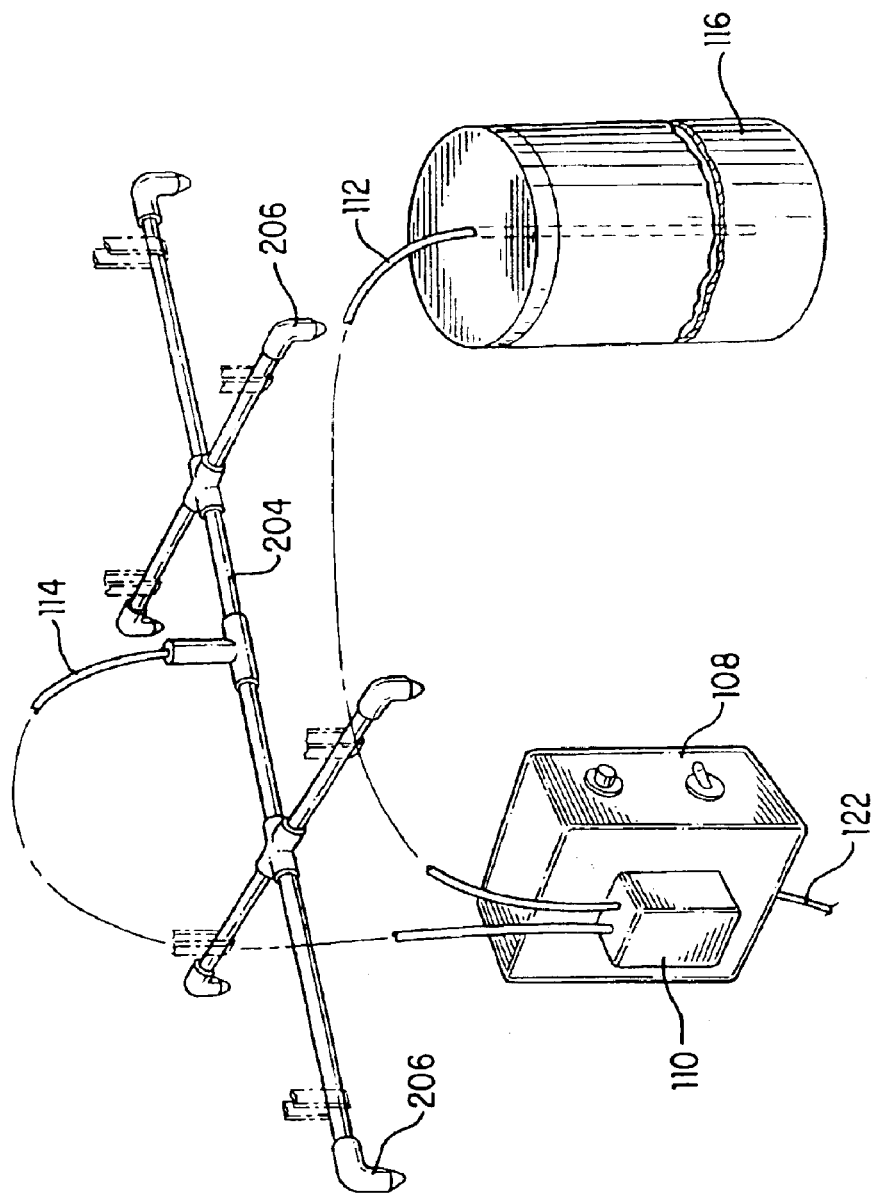
FIG. 4 is a perspective view of a basting apparatus in accordance with the present invention shown outside the confines of housing.

FIG. 4 shows the liquid dispensing system outside the confines of housing 102. Container 116 holds a basting liquid. Any suitable container may be used. The container is alternatively constructed out of plastic, metal, glass or any other suitable material for holding a liquid. Supply tube 112 extends at one end into the interior of container 116, as shown in FIG. 4. At the other end, supply tube 112 is connected to pump 110 at its inlet connection. Delivery tube 114 is connected at one end to pump 110 at the outlet connection of pump 110. At a second end, delivery tube 114 is coupled to apparatus 204. In a preferred embodiment, where delivery tube 114 is plastic or rubber, delivery tube 114 fictionally engages a nozzle or protrusion on apparatus 204. Where delivery tube 114 is of more rigid construction, such as pipe, a screwed or threaded connection onto apparatus 204 is used.

In the preferred mode of operation, the electronics and control box 108 selectively activate pump 110 to eject a basting liquid out of nozzles 206. A basting liquid is stored in container 116. The basting liquid may be water, vinegar, beer, wine, barbecue sauce or any other liquid desired. When activated by the electronic control circuit, pump 110 draws the basting liquid from container 116 via supply tube 112 and injects the liquid into delivery tube 114 and out of nozzles 206. By selectively activating pump 110, a basting liquid is forced through nozzles 206 and hence onto food portions on any food supporting structure below.

Figure 5:
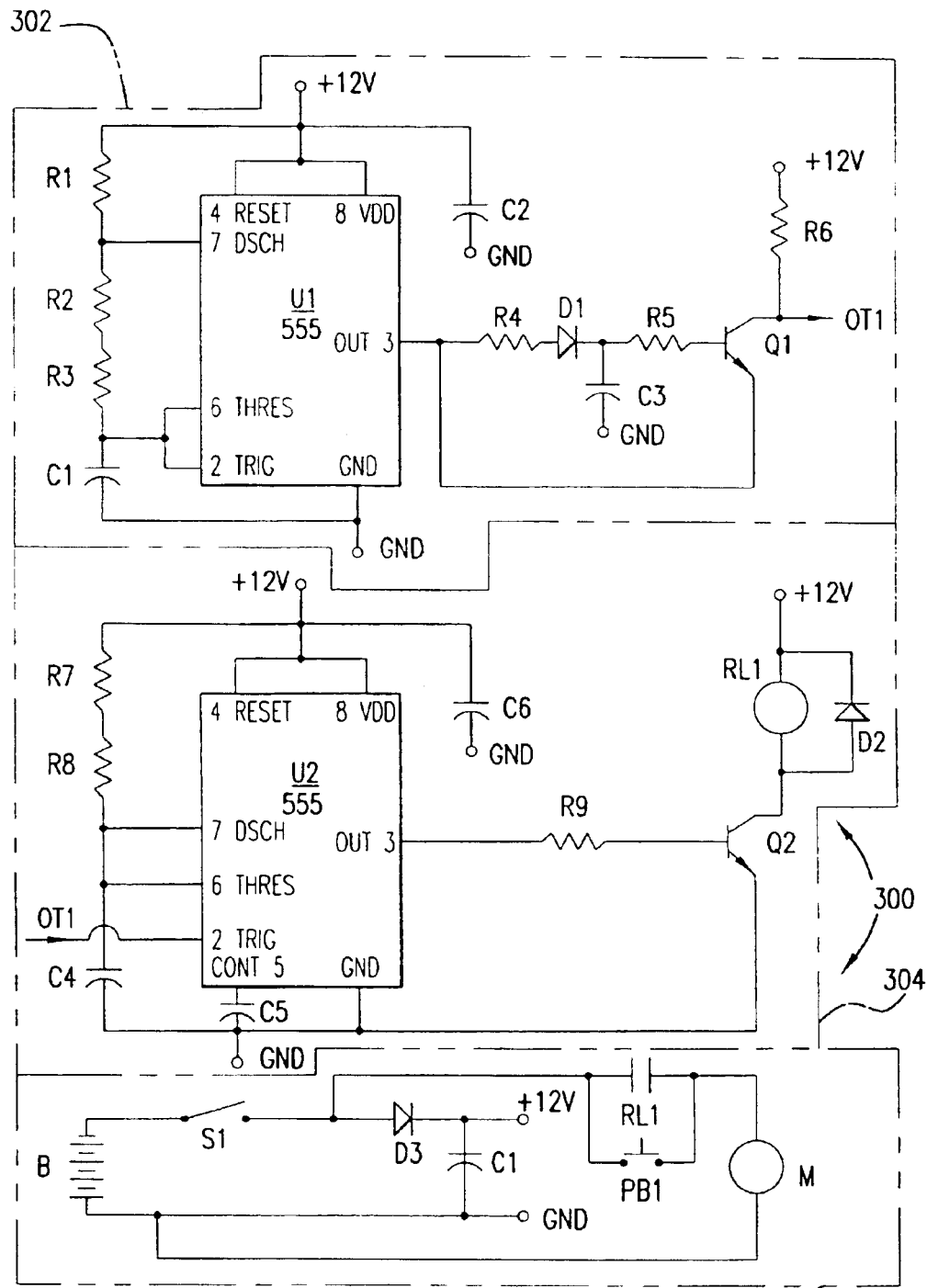
FIG. 5 is a schematic of a control circuit for operating the self-basting cooking apparatus in accordance with the present invention.

FIG. 5 shows a control circuit 300 for activating pump 110 in accordance with the invention. Control circuit 300 includes a first timer circuit 302, a second timer circuit 304 and a power circuit 306. First timer circuit 302 determines the time interval between ejection or spraying of the basting liquid out of nozzles 206. Second timer circuit 304 determines the duration or time interval during which the basting liquid is ejected out of nozzles 206. Power circuit 306 provides power to the control circuit 300 and to a motor M, which activates pump 110. Each of the first and second timer circuits 302, 304 include a 555 timer, the operation of which is known to those of skill in the art.

First timer circuit 302 includes 555 timer U1, which is controlled by a network of resistors and capacitors to set a time for switching an output OT1. Output OT1 is used by second timer circuit 304 to trigger activation of pump 110. The network of resistors and capacitors consisting of R1, R2, R3 and C1 are connected to the trigger, threshold and discharge inputs of 555 timer U1 as shown in FIG. 5. These inputs control the output of 555 timer U1, which in turn switches transistor Q1 to drive output OT1. In the preferred embodiment, resistors R1, R2 and R3 are one megaohm; and R4, R5 and R6 are ten kiloohms. Also, capacitors C1, C2 and C3 are 220 microfarads, 0.1 microfarads and 22 microfarads, respectively. These values provide a time interval between sprays of approximately fifteen minutes. Of course, other resistor values, a variable resistor, or an alternate timer circuit are alternatively used for a different time interval.

Second timer circuit 304 includes 555 timer U2, which uses a network of resistors and capacitors and the output OT1 from first timer circuit 302 to energize a relay RL1, which in turn closes contact RL1, providing power to motor M of pump 110. Output OT1 from first timer circuit 302 is used as the trigger input to 555 timer U2. The threshold and discharge inputs of 555 timer U2 are connected to a network of resistors and capacitors as shown. The network of resistors and capacitors consisting of R7, R8 and C4 sets the duration of each spray of nozzles 206. These inputs control the output of 555 timer U2, which in turn switches transistor U2 on and off. In the preferred embodiment, resistors R7, R8 and R9 are 47 kiloohms, 33 kiloohms and 10 kiloohms, respectively. Capacitor C4, C5 and C6 are 47 microfarads, 0.01 microfarads and 0.1 microfarads, respectively. These values preferably provide a spray from nozzles 206 of approximately four seconds in duration. Of course, other resistor values, a variable resistor, or an alternate timer circuit are alternatively used to provide a different duration.

Power circuit 306 includes a battery B and a switch $1, which must be closed to power control circuit 300. In addition to cutting on the motor using contact RL1 of the relay, as discussed above, a switch PB1 is provided to allow manual activation of the motor to spray the basting liquid from nozzles 206. In a preferred embodiment, capacitor C7 is 10 microfarads. The invention described herein provides automatic basting of food during the food preparation process. By use of a timer controlled pump, the necessity of a pressurized basting liquid is advantageously eliminated. Also, no compressed air is required. The invention being thus described, it will be evident that the same may be varied in many ways. Such variations are not to be regarded as a departure from the spirit and scope of the invention and all such modifications are intended to be included within the scope of the claims.

What is claimed is:

1. An oven comprising:
   a housing;
   a food supporting structure mounted within the housing;
   a heat source located within the housing;

a plurality of nozzles mounted in spaced relationship to each other perpendicular the food supporting structure;

a delivery tube connected to the plurality of nozzles such that a basting liquid in the delivery tube may be transported to the plurality of nozzles;

a pump having a first connection point and a second connection point;

a supply tube connected to the first connection point on the pump and the delivery tube connected to the second connection point on the pump; and an electronic control circuit operably coupled to the pump to activate the pump to transfer the basting liquid from the first connection point, thereby transporting the basting liquid in the supply tube through the delivery tube to the plurality of nozzles;

wherein the electronic control circuit comprises:

a first timer circuit for determining an interval of time to activate the pump; and a second timer circuit for determining a duration of time for activating the pump; and wherein the pump delivers the basting liquid at the interval of time for the duration of time.

2. The oven of claim 1, wherein the supply tube is connected to a supply container.

3. The oven of claim 1, wherein the food supporting structure comprises one of a rack and rotisserie.

4. The oven of claim 1, wherein the interval of time is selectable.

5. The oven of claim 1, wherein the heating source comprises one of electricity and gas.

6. The oven of claim 1, wherein the electronic control circuit further comprises a manually actuated switch for activating the pump to transfer a substance from the first connection point to the second connection point.

7. The oven of claim 6, wherein the electronic control circuit further comprises a relay that activates the pump at the interval of time.

8. A method of cooking a food item on a food supporting structure comprising the steps of:

placing a food item on a food supporting structure;

heating the food item with a heat source wherein the heat source is located within a housing;

actuating an electronic control circuit to activate a pump to supply a basting liquid into a delivery tube; and supplying the basting liquid to the food item from the delivery tube, wherein the basting liquid is dispensed by the pump at a predetermined interval for a predetermined duration, and wherein the electronic circuit includes a first timer circuit that determines the predetermined interval and a second timer circuit that determines the predetermined duration.

9. The method of claim 8 further comprising the step of activating the pump at selectable predetermined intervals.

10. The method of claim 8 wherein the food supporting structure is one of a rack and rotisserie.

11. The method of claim 9 wherein the basting liquid is stored in a supply container and the pump draws the basting liquid from the supply container using a supply tube.

12. The method of claim 8 wherein the basting liquid is one of water, vinegar, wine, beer and barbecue sauce.

13. A oven comprising:

a housing;

a food supporting structure mounted within the housing;

a heat source located within the housing;

at least one nozzle mounted perpendicular to the food supporting structure;

a delivery tube connected to the at least one nozzle such that a basting liquid in the delivery tube may be transported to the at least one nozzle;

a pump having a first connection point and a second connection point;

a supply tube connected to the first connection point on the pump and the delivery tube connected to the second connection point on the pump; and an electronic control circuit operably coupled to the pump to activate the pump to transfer the basting liquid from the first connection point to the second connection point, thereby transporting the basting liquid in the supply tube through the delivery tube to the at least one nozzle;

wherein the electronic control circuit comprises:

a first timer circuit for determining an interval of time to activate the pump; and a second timer circuit for determining a duration of time for activating the pump; and wherein the pump delivers the basting liquid at interval of time for the duration of time.

* * * * *